(12) United States Patent
Etou et al.

(10) Patent No.: US 6,216,809 B1
(45) Date of Patent: Apr. 17, 2001

(54) SNOWMOBILE INDUCTION SYSTEM

(75) Inventors: Toyochika Etou; Masanobu Yamoto; Shinobu Amano, all of Iwata (JP)

(73) Assignee: Yamaha Hatsudoki Kabushiki Kaiasha, Iwata (JP)

( * ) Notice: Subject to any disclaimer, the term of this patent is extended or adjusted under 35 U.S.C. 154(b) by 0 days.

(21) Appl. No.: 09/510,398

(22) Filed: Feb. 22, 2000

(30) Foreign Application Priority Data

Feb. 19, 1999 (JP) .................................................. 11-042313

(51) Int. Cl.⁷ .................................................... B60K 13/02
(52) U.S. Cl. .................... 180/68.3; 180/68.1; 123/41.56; 123/41.58
(58) Field of Search ................................ 180/68.1, 68.3, 180/190, 191; 123/41.5, 41.56, 41.58, 41.6; 55/385.3

(56) References Cited

U.S. PATENT DOCUMENTS

| 4,155,414 | | 5/1979 | Fujikawa et al. . | |
| 4,249,626 | * | 2/1981 | Fields et al. | 180/54 A |
| 4,340,123 | * | 7/1982 | Fujikawa | 180/54 A |
| 5,117,932 | * | 6/1992 | Kurosu et al. | 180/68.2 |
| 5,129,473 | * | 7/1992 | Boyer | 180/68.3 |
| 5,152,255 | * | 10/1992 | Fukuda | 123/41.33 |
| 5,152,365 | | 10/1992 | Aoshima . | |
| 5,174,258 | * | 12/1992 | Tanaka | 123/198 E |
| 5,251,718 | * | 10/1993 | Inagawa et al. | 180/190 |
| 5,957,230 | | 9/1999 | Harano et al. . | |
| 6,109,217 | * | 8/2000 | Hedlund et al. | 123/41.01 |

* cited by examiner

Primary Examiner—Eric Culbreth
Assistant Examiner—L. Lum
(74) Attorney, Agent, or Firm—Knobbe, Martens, Olson & Bear, LLP

(57) ABSTRACT

A snowmobile is provided including an internal combustion engine, an induction system communicating with the engine, and a body defining an engine compartment in which the engine is at least in part contained. The body of the snowmobile includes at least two openings which communicate with the induction system, and a door movably positioned at at least one of the openings. The door is adapted to selectively open and close the opening to regulate a flow of induction air through the opening.

20 Claims, 6 Drawing Sheets

SNOWMOBILE INDUCTION SYSTEM

PRIORITY INFORMATION

This application is based on and claims priority to Japanese Patent Application No. 11-042313, filed Feb. 19, 1999.

BACKGROUND OF THE INVENTION

1. Field of the Invention

The invention relates to an induction system for an internal combustion engine and more particularly to an induction system for the powering internal combustion engine of a snowmobile.

2. Description of the Related Art

It is the normal practice to position a powering internal combustion engine of a snowmobile within an engine compartment. This is done at least in part to protect the engine from the surrounding environment. Air is generally drawn from the engine compartment into the induction system of the engine.

When the snowmobile is operated, the temperature of the air drawn from inside the engine compartment is generally warmer than that of the outside air because of the heat generated by the engine. If the temperature of the induction air is too high, engine performance is compromised.

It is, therefore, a principal object of the present invention to provide an induction system for the internal combustion engine of a snowmobile wherein induction air is normally supplied to the induction system from outside of the engine compartment.

However, because the induction air is drawn from the outside rather than from the protected confines of the engine compartment, in certain operating conditions it may be more likely that snow and other foreign materials will enter the induction system along with the induction air, thereby degrading engine performance or harming the engine. Thus, in certain limited conditions, such as when the snowmobile is operated in deep snow, it may be more desirable to induct air from inside the engine compartment.

It is therefore a further object of the present invention to provide an induction system for the internal combustion engine of a snowmobile wherein the induction air can selectively be drawn from either outside or inside of the engine compartment.

SUMMARY OF THE INVENTION

One aspect of the present invention involves a snowmobile comprising an internal combustion engine and an induction system communicating with the engine. A body of the snowmobile defines an engine compartment in which the engine is located, at least in part. The body also includes first and second opening that communicate with the induction system. A door is movably positioned at the first opening to selectively regulate a flow of induction air through the first opening In one embodiment of the invention, the first opening is an air inlet opening that admits air from outside the engine compartment. The inlet opening preferably is formed on a raised portion of the body, which is located in front of a seat of the snowmobile.

One or more sub-openings may also be provided for admitting induction air into the intake passage from inside or outside of the engine compartment. A sub-door is provided at each sub-opening and is movable with respect to the sub-opening to open and close the sub-opening. The sub-doors are arranged to be opened to admit induction air into the intake passage when the air inlet doors are closed.

For purposes of summarizing the invention and the advantages achieved over the prior art, certain objects and advantages of the invention have been and will be described. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

DETAILED DESCRIPTION OF THE PREFERRED EMBODIMENT

Figure 1:
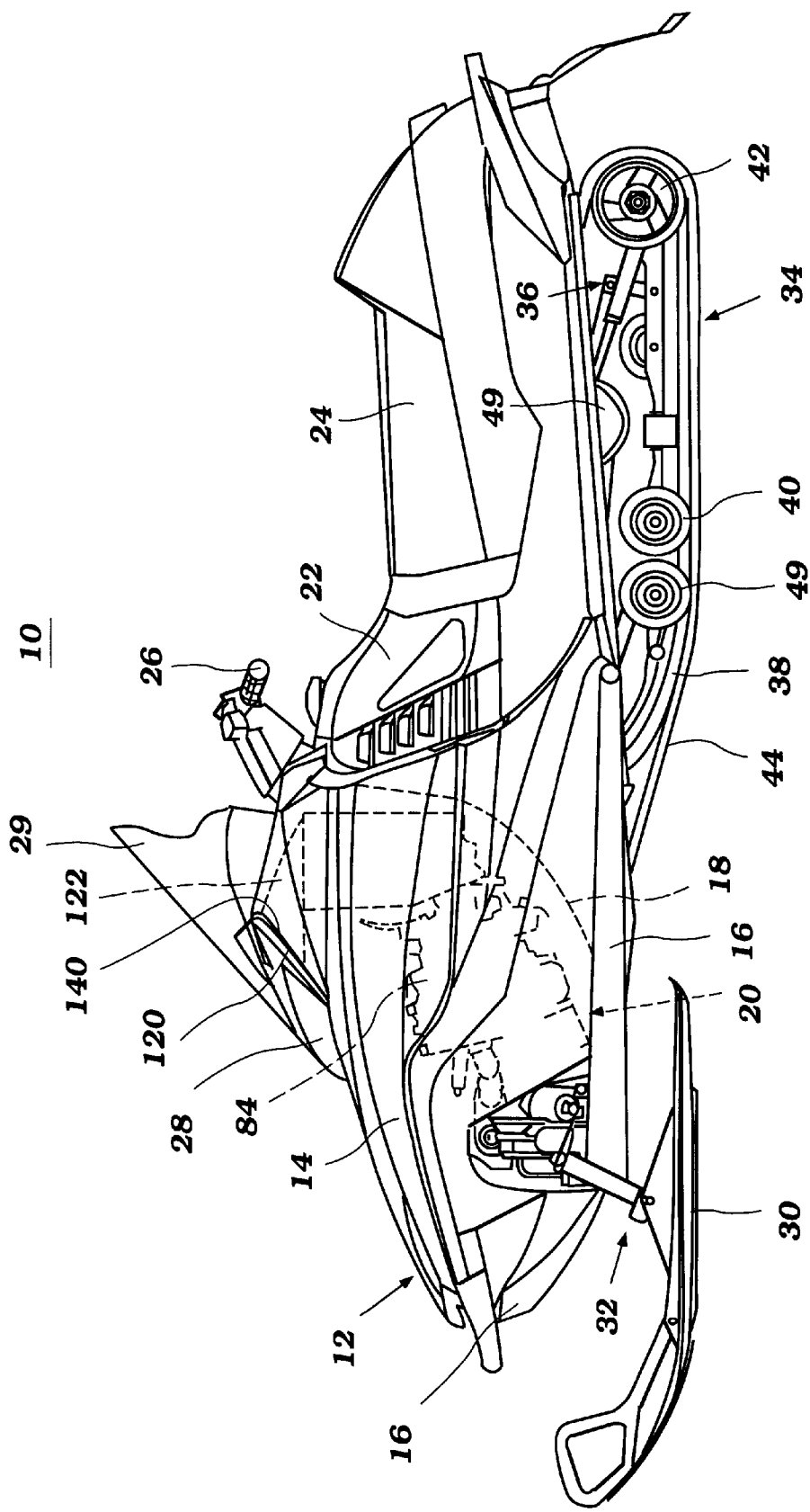
FIG. 1 is a side elevational view of a snowmobile having an induction system in accordance with a preferred embodiment of the present invention.
Figure 2:
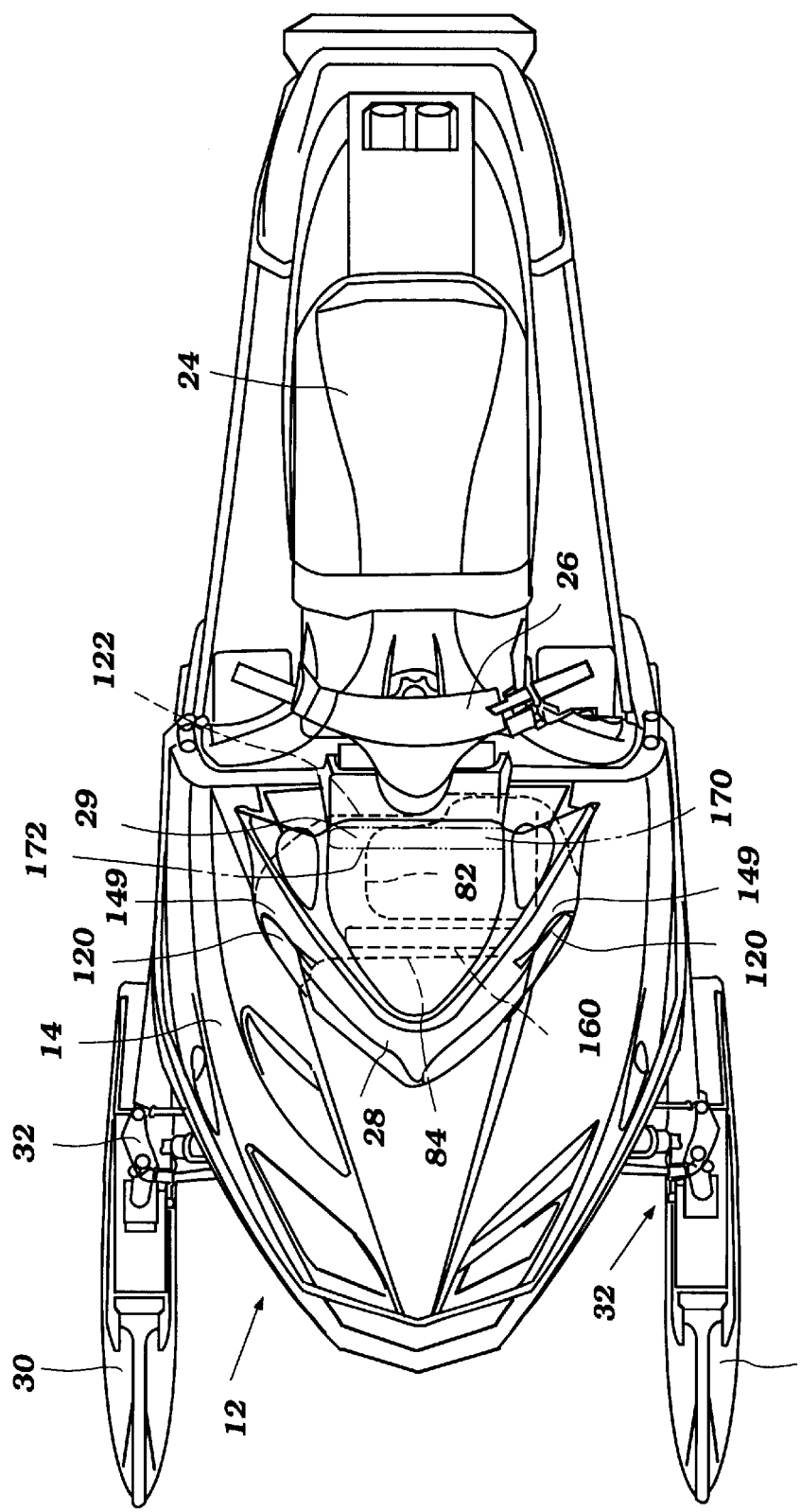
FIG. 2 is a top plan view of the snowmobile of FIG. 1, with certain elements of the induction system shown in phantom.
Figure 3:
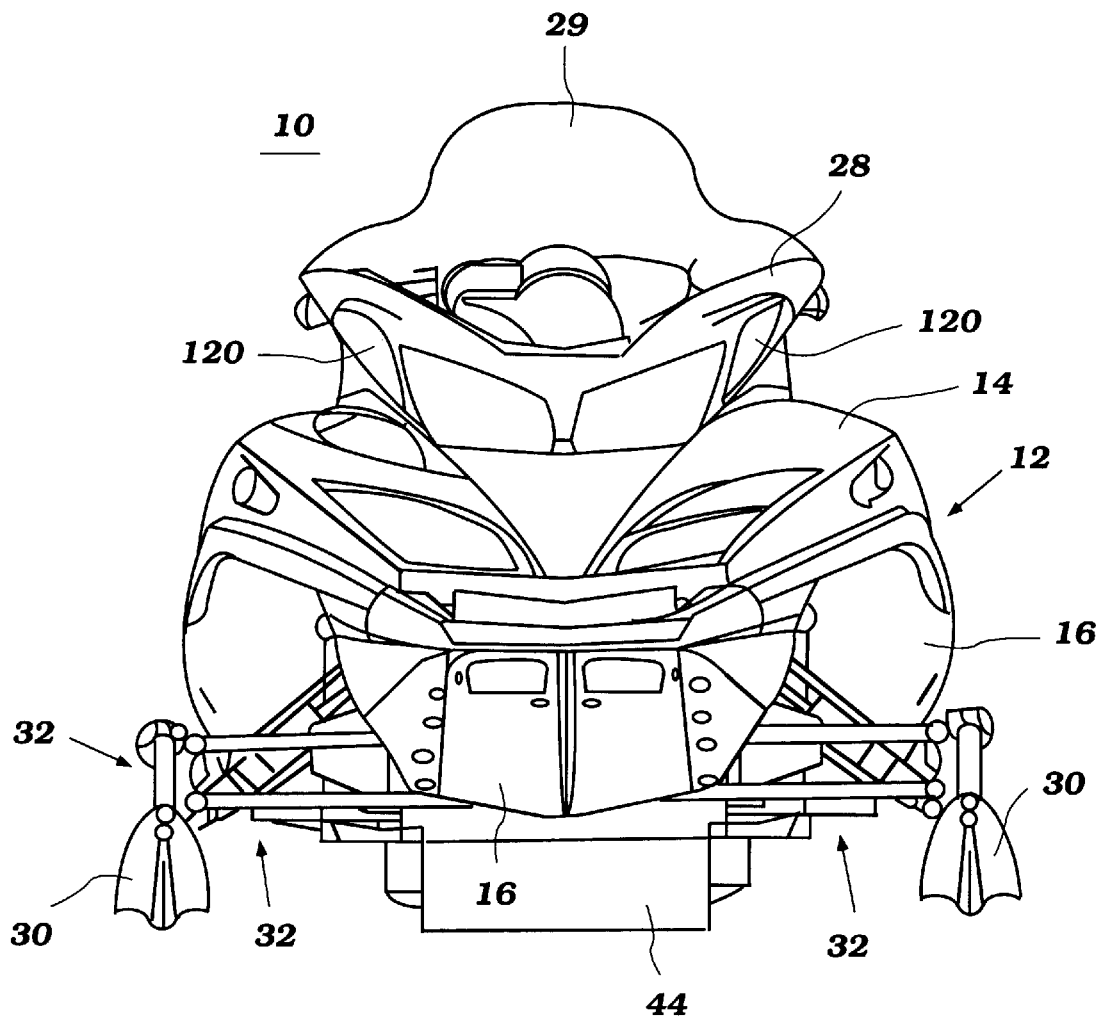
FIG. 3 is a front elevational view of the snowmobile of FIG. 1.

With reference initially to FIGS. 1–3, a snowmobile constructed in accordance with an embodiment of the present invention is identified generally by the reference numeral 10. The snowmobile 10 includes a body assembly 12 made up of a number of parts which may be formed from suitable materials. The body assembly 12 includes an upper engine shroud 14 and a lower tray 16, which together define an engine compartment 18. The engine compartment 18 houses an internal combustion engine 20 for powering the snowmobile 10.

The body assembly 12 further includes a rear portion 22 that accommodates a seat 24 adapted to seat one or more riders in a straddle fashion. A handlebar assembly 26 is positioned in front of the seat 24 for operation by the rider.

The upper engine shroud 14 includes a raised portion 28 located in front of the handlebar assembly 26. The raised portion 28 carries a windshield 29 for affording protection to the rider from wind, snow, branches and other objects when operating the snowmobile 10.

A pair of front skis 30 are supported at a forward portion of the body 12 by means of a front suspension system 32. The handlebar assembly 26 is linked to the front skis 30 in a suitable manner such that movement of the handlebar 26 results in a corresponding steering movement of the front skies 30, as is well known in the art.

A carriage assembly 34 is supported at the rear portion of the body 12 below the seat 24 by a rear suspension system 36. The carriage assembly 34 includes a pair of guide rails 38 that carry a plurality of idler rollers 40, including a main rear idler roller 42.

The guide rails 38 and idler rollers 40, 42 cooperate to form a path around which a drive track 44 is trained. The drive track 44 is driven by an output shaft (not shown) of the engine 20 through a suitable variable belt-type transmission (not shown), as is well known in the art.

Figure 4:
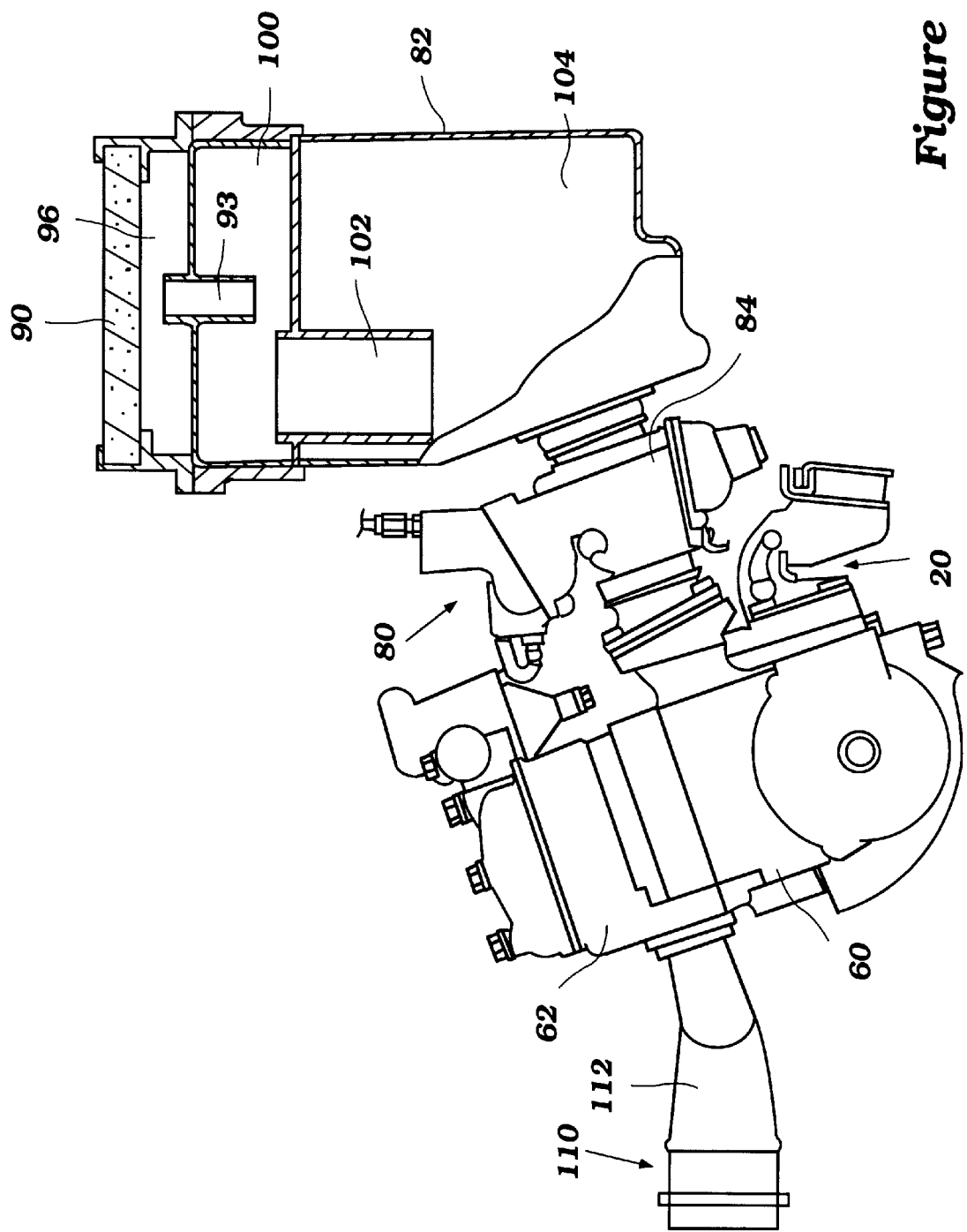
FIG. 4 is a side elevational view of the powering internal combustion engine of the snowmobile of FIG. 1 and an attached air box, with a portion of the air box broken away.

With reference now to FIGS. 1 and 4, the engine 20 is comprised of a cylinder block 60 which extends generally transversely across the engine compartment 18 and is supported in the engine compartment 18 on suitable engine mounts (not shown). In the illustrated embodiment, the engine 20 is of the three cylinder inline variety and operates on a two cycle crankcase compression principal. However, the invention is not to be limited to any specific type of engine, and an engine having greater or fewer cylinders and/or operating on a four cycle or rotary cycle can be used.

The cylinder block 60 has three transversely aligned cylinder bores formed therein. The cylinder bores are closed by a cylinder head assembly 62 mounted to an upper end of the cylinder block 60.

Air is delivered to the engine 20 by an induction system which is identified generally by the reference numeral 80. The induction system 80 includes an air box 82. In the illustrated embodiment, the air box 82 is shaped to fit below the raised portion 28 of the upper engine shroud 14 immediately in front of the handlebar assembly 26.

A filter element 90 is provided at a suitable location in the induction air path for preventing foreign materials such as snow and ice from entering the engine 12 through the induction system 80. In the embodiment illustrated in FIG. 4, the filter element 90 is provided at the top or inlet of the air box 82. In addition or in the alternative, the induction system 80 may be configured to eliminate the need for a filter element, such as by forcing the induction air to follow a circuitous path through the induction system 80 in order to separate out any snow, water or other debris that may be present in the induction air.

In the embodiment illustrated in FIG. 4, the air box 82 is divided into three chambers. Induction air flows through the filter element 90 and then expands into a first expansion chamber 96. From the first expansion chamber 96, the induction air flows through a first connection passage 98 and into a second expansion chamber 100. The induction air flows through the relatively small diameter connection passage 98 and expands upon entering the second expansion chamber 100. From the second expansion chamber 100 the induction air flows through a second connection passage 102 and into a third expansion chamber 104, where it expands again. This successive expansion of the induction air results in silencing of the air flow.

The air box 82 delivers air to a fuel supply unit 84, which may include a carburetor for forming a fuel/air charge. The fuel also can be injected into the induction system or into the engine 12 by one or more fuel injectors. The carburetor delivers the fuel/air charge to an intake port of the engine 20 through a short connecting manifold. A reed type check valve is provided in the intake port to permit flow into the crankcase of the engine 12 and to prevent flow in the opposite direction.

The air/fuel charge is admitted to the crankcase chamber of the cylinder block 60 of the engine 12 and transferred through scavenge ports to the combustion chamber where it is fired by a suitable ignition system. The charge is exhausted from the combustion chamber through exhaust ports formed on the front side of the cylinder block 60 in the illustrated embodiment and delivered to an exhaust system, indicated generally by the reference numeral 110. The exhaust product is then discharged to the atmosphere through an exhaust pipe 112.

In accordance with the present invention, and as illustrated in FIGS. 1–3, air inlet openings 120 are provided in the body 12 of the snowmobile 10 for admitting air into the induction system 80 of the engine 12. Preferably, the air inlet openings 120 are provided in the raised portion 28 of the upper engine shroud 14 and face forwardly in the normal direction of travel of the snowmobile 10. However, the air inlet openings 120 may be provided at other locations in the body 12 of the snowmobile e.g., on the rear side of the windshield 29, and need not necessarily face in a forward direction. For instance, in the illustrated embodiment, at least one air inlet opening 120 is provided on either side of the windshield 29 (i.e., on the front side of the windshield 29). The openings can also face rearward, upward, downward, outward to the sides, or any combination thereof.

An air intake passage 122 is provided between the air inlet openings 120 and the air box 82. In the illustrated embodiment, the air intake passage 122 generally fills the space above the air box 82 and below the raised portion 28 of the upper engine shroud 14. Upon entering through the air inlet openings 120, air from the atmosphere flows through the air intake passage 122 and into the air box 80. Because the induction air is not circulated in the engine compartment 18 before entering the induction system 80, the temperature of the induction air is not significantly increased by engine heat, and engine performance is therefore not degraded.

Figure 5:
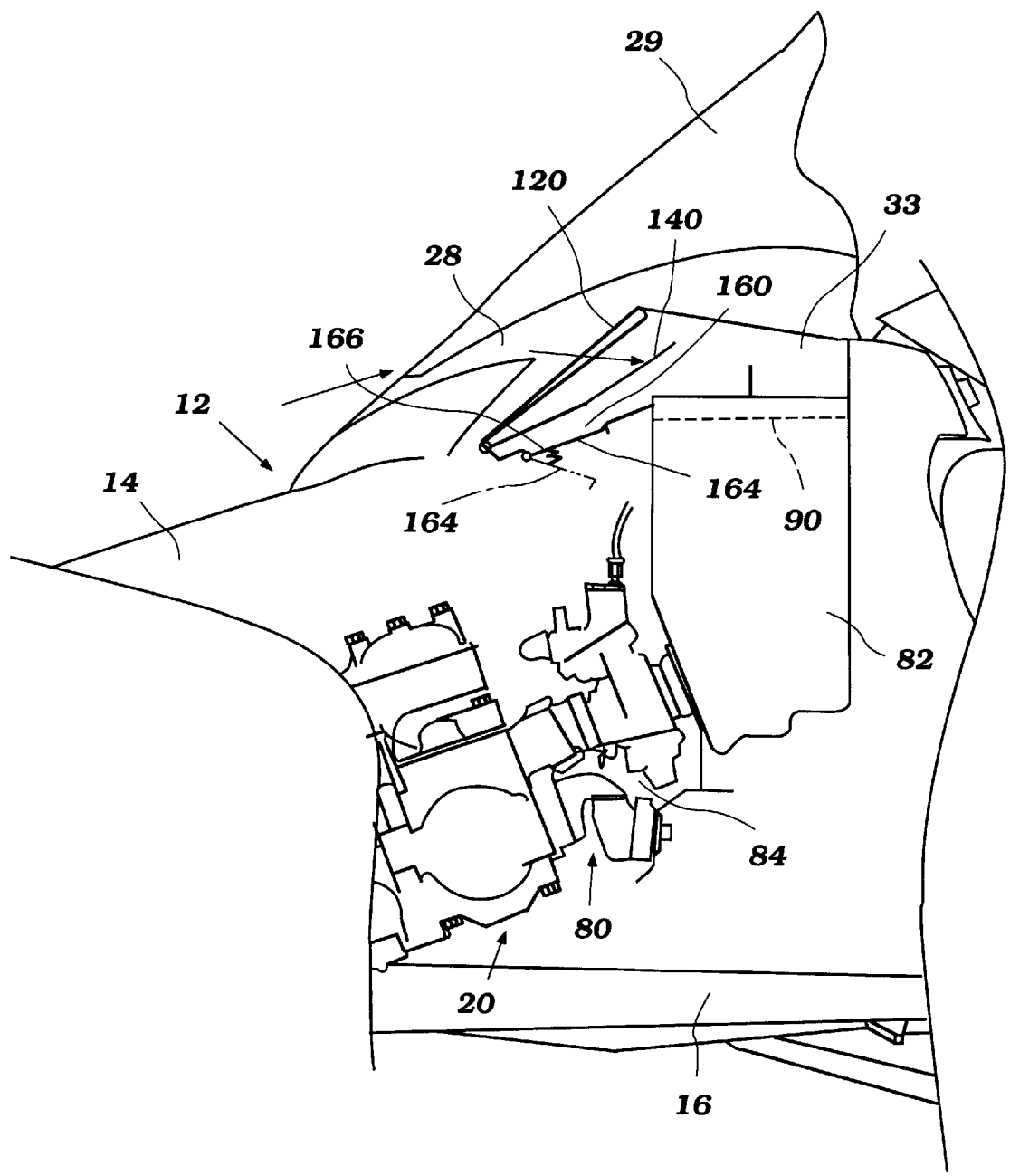
FIG. 5 is a side elevational view of the snowmobile of FIG. 1 with a portion of the upper engine shroud removed.

With reference now to FIG. 5, an air inlet door 140 is provided at each air inlet opening 120. In the illustrated embodiment, the air inlet doors 140 are pivotally attached to the upper engine shroud 14 and pivot with respect to the upper engine shroud 14 to open and close the air inlet openings 120. The flow of induction air through the air inlet openings 120 is thereby regulated. Although the illustrated embodiment employs doors that pivot about an axis positioned at one edge of the opening, the doors can move relative to the opening in any of a wide variety of known ways. For example, the air inlet doors 140 may open and close the air inlet openings 120 by sliding toward and away from the air inlet openings 120, or by rotating about a central axis of the air inlet doors 140 similar to a butterfly valve. In the illustrated embodiment, a spring 142 (see FIG. 6) is provided between each air inlet door 140 and an adjacent location on the engine shroud 14 in the to bias the air inlet doors 140 in a normally open position.

Figure 6:
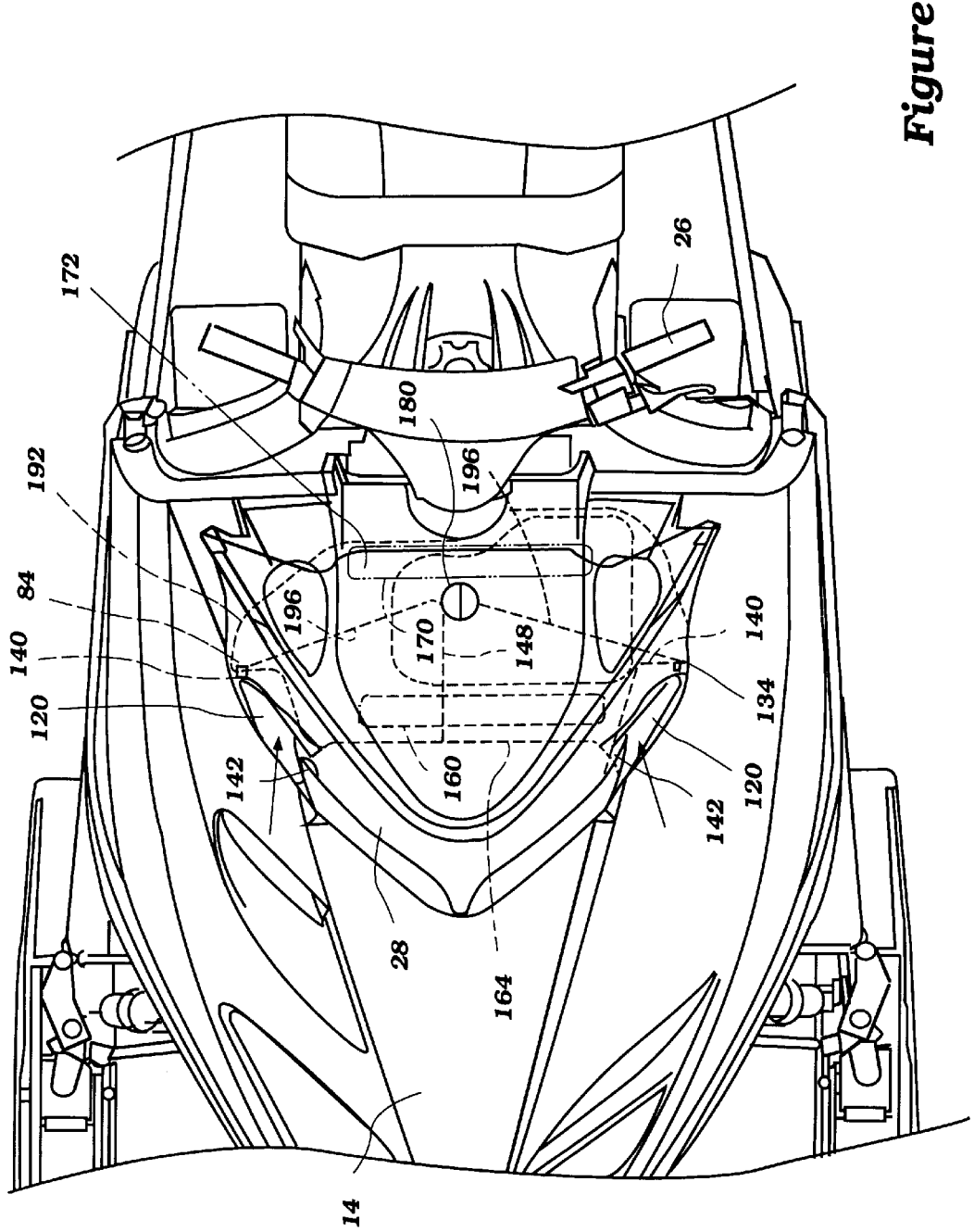
FIG. 6 is a top plan view of a center portion of the snowmobile of FIG. 1, with certain elements of the induction system shown in phantom.

A sub-opening 160 may also be provided for admitting air into the air intake passage 122. In the illustrated embodiment, the sub-opening 160 is provided in a lower wall surface of the air intake passage 122 between the two air inlet openings 120, as shown in FIGS. 5 and 6. The sub-opening 160 is located in the lower surface of the air intake passage 122 behind the air inlet openings 120 and in front of the air box 82.

As illustrated in FIG. 5, a sub-door 164 preferably is provided at the sub-opening 160; however, certain aspects of the present invention can be practiced without the use of the sub-door. In the illustrated embodiment, the sub-door is pivotally attached to the lower wall surface of the intake passage 122 for opening and closing the sub-opening 160. When open, the sub-opening 160 allows air from the engine compartment 18 to flow into the intake passage 122 and into the induction system 80 of the engine 20. A spring 166 is provided between the sub-door 164 and an adjacent location on the wall surface of the intake passage 122 or the engine shroud 14 to bias the sub-door 164 in a normally closed position. As with the air inlet doors 140, the sub-door 164 also can be configured to move relative to the sub-opening 164 in any of a wide variety of ways, including, but not limited to, those recited above.

Either alternatively or in addition to the sub-opening 160 located in the lower wall surface of the intake passage 122, a second sub-opening 170 may be provided in an upper wall surface of the intake passage 122, as illustrated in FIG. 6. The second sub-opening 170 is preferably located behind the windshield 29 of the snowmobile 10 and in front of the handlebar assembly 26. In the illustrated embodiment, a second sub-door 172 is pivotally attached to the upper engine shroud 14 to open and close the second sub-opening 170 in a manner similar to that of the other sub-door 164 and sub-opening 160. The second sub-door 172 is similarly biased in a normally closed position. However, when the second sub-door 172 is open, outside air (i.e., air from outside the engine compartment 18) is allowed to flow into the intake passage 122 and into the induction system 80 of the engine 20. Again, as with the air inlet doors 140 and the sub-door 164, the second sub-door 172 also can be configured to move relative to the second sub-opening 170 in any of a wide variety of ways, including, but not limited to, those recited above.

In a preferred embodiment of the invention, a handle operator 180 is provided for selectively opening and closing the air inlet doors 140, and possibly for opening and closing the other doors, as will described below. In the embodiment illustrated in FIG. 6, the handle operator 180 extends from the raised portion 28 of the upper engine shroud 14 between the windshield 29 and handlebar assembly 26. However, the handle operator 180 may be positioned at any location within reach of a rider while positioned on the snowmobile 10.

The handle operator 180 operates an actuator mechanism which, in turn, actuates the air inlet doors 140 to open and close the air inlet openings 120. In the embodiment shown in FIG. 6, the actuator mechanism is a wire and pulley system. However, it is to be understood that other types of actuators, which could include mechanical linkages and/or electrical actuators connected to the operator by fly-by-wires, may also be used.

In the illustrated embodiment, the actuator mechanism includes control wires 196 which link the handle operator 180 to the air inlet doors 140. The control wires 196 extend from the handle operator 180 around pulley pins 184 and are attached to the air inlet doors 140. A control wire 198 is also provided for linking the handle operator 180 to the sub-door 164 for opening and closing the sub-opening 160 in the lower wall surface of the intake passage 122. The control wire 198 extends from the handle operator 180 around a pulley pin (not shown) and is attached to the sub-door 164. Similarly, if a second sub-opening is provided in the upper wall surface of the intake passage 122, another control wire would be provided between the handle operator 180 and the second sub-door 172.

When the handle operator 180 is turned, the control wires 196 pull on the air inlet doors 140 to overcome the force of the springs 142. The air inlet doors 140 are thereby pivoted from their normally open positions to close the air inlet openings 120. Outside air is thus prevented from entering the intake passage 122 through the air inlet openings 120. In like manner, the turning of the handle operator 180 also causes the control wire 198 to pull on the sub-door 164. The sub-door 164 is thereby pivoted from its normally closed position to open the sub-opening 160. Air from the engine compartment 122 is thus allowed to enter the intake passage 122 through the sub-opening 160. Thus, the sub-door 164 is opened as the air inlet openings 140 are closed.

During normal operation of the snowmobile 10, the air inlet doors 140 remain opened to allow outside air to enter the intake passage 122 and induction system 80 directly through the air inlet openings 120. Because the induction air is not circulated in the engine compartment 18 before entering the induction system 80, the temperature of the induction air is not significantly increased by engine heat, and engine performance is therefore not degraded.

However, when deep snow or other adverse environmental conditions are encountered, the operator of the snowmobile 10 can turn the handle operator 180 to close the air inlet doors 140 and thereby prevent snow and water from entering the induction system 80 through the air inlet openings 120. As a result, clogging of the filter element 90 and/or water damage to the engine 20 is prevented. As the air inlet doors 140 are closed, the sub-door 164 is opened to allow air into the induction system 80 from the protected engine compartment 18. The opening of the sub-door 164 preferably occurs simultaneously with the closing of the air inlet doors 140.

In certain conditions (e.g., when the outside air temperature is relatively low), it may be desirable to admit a mixture of outside air and air from the engine compartment 18 into the intake passage 122 to optimize engine performance. In such conditions, the handle operator 180 may be turned only slightly to partially close the air inlet doors 140, and partially open the sub-door 164.

If a second sub-opening 170 is provided in the upper wall surface of the intake passage 122 in addition to, or instead of, the sub-opening 160, the second sub-door 172 is similarly opened as the air inlet doors 140 are closed. As a result, outside air enters the intake passage 122 and induction system 80 directly. However, because the second subopening 170 is located immediately behind the windshield 29, it is generally protected from snow and other foreign materials that might otherwise enter the sub-opening 170 and clog the filter element 90 or damage the engine 20. In addition, one advantage of the location of the second sub-opening 170 is that outside air can be admitted to the intake passage 122 directly even when the air inlet openings 120 are closed because of adverse conditions. As a result, engine performance is not degraded even when the air inlet doors 140 are closed.

It should be readily apparent from the foregoing that the described embodiment provides an effective induction system for the engine of a snowmobile wherein the operator of the snowmobile can selectively open and close air inlet openings formed in the body of the snowmobile to allow or prevent outdoor air from entering the induction system directly. Of course, the foregoing description is that of a preferred embodiment of the invention and various changes and modifications may be made without departing from the spirit and scope of the invention, as defined by the appended claims.

What is claimed is:

1. A snowmobile comprising an internal combustion engine, an induction system communicating with said engine, a body defining an engine compartment in which said engine is at least in part contained, said body including at least first and second openings communicating with said induction system, and a door movably positioned at said first opening to selectively regulate a flow of induction air through said first opening.

2. The snowmobile of claim 1, wherein said first opening is an air inlet opening formed in a raised portion of said body, and said raised portion is located in front of a seat of said snowmobile.

3. The snowmobile of claim 2, wherein said induction system includes an air box and said air inlet opening is provided in said raised portion above and in front of said air box.

4. The snowmobile of claim 2, wherein said air inlet opening faces substantially in a direction of travel of said snowmobile.

5. The snowmobile of claim 1, wherein said second opening is a sub-opening communicating with said engine compartment.

6. The snowmobile of claim 5, wherein a sub-door is provided at said sub-opening, said sub-door regulating a flow of induction air through said sub-opening from said engine compartment.

7. The snowmobile of claim 1, wherein said second opening is a sub-opening located behind a windshield of said snowmobile, said sub-opening communicating with an atmosphere outside said engine compartment.

8. The snowmobile of claim 7, wherein a sub-door is provided at said sub-opening, said sub-door regulating a flow of induction air through said sub-opening from the atmosphere outside said engine compartment.

9. A snowmobile comprising an internal combustion engine, an induction system communicating with said engine, a body defining an engine compartment in which said engine is at least in part contained, said body including at least first and second openings therein, said first opening communicating with said induction system and the atmosphere outside said engine compartment, and said second opening communicating with said induction system and said engine compartment.

10. The snowmobile of claim 9, further comprising a door movably positioned with respect to one of the first and second openings to regulate a flow of induction air through the corresponding opening.

11. The snowmobile of claim 10, wherein said door is a first door movably positioned at said first opening, said first door regulating a flow of induction air through said first opening.

12. The snowmobile of claim 11, further comprising a second door movably positioned at said second opening, said second door regulating a flow of induction air through said second opening.

13. The snowmobile of claim 12, further comprising an operator handle, said operator handle operating an actuator which actuates said first and second doors to open and close said first and second openings.

14. The snowmobile of claim 13, wherein said actuator comprises a wire and pulley system including one or more wires which extend from said operator handle to said first and second doors.

15. The snowmobile of claim 13, wherein said actuator is configured to open the second door as said first door is closed.

16. A snowmobile comprising an internal combustion engine, an induction system communicating with said engine, a body defining an engine compartment in which said engine is at least in part contained and a windshield attached to said body, said body including at least first and second openings communicating with said induction system, said first opening being provided in said body at a location in front of said windshield, and said second openings being provided in said body at a location behind said windshield.

17. The snowmobile of claim 16, further comprising a door positioned at said first opening, said door regulating an amount of induction air through said first opening.

18. The snowmobile of claim 17, further comprising an operator handle located behind said windshield, said operator handle operating an actuator to selectively open and close said door.

19. The snowmobile of claim 16, further comprising a second door movably positioned at said second opening, said second door regulating a flow of induction air through said second opening.

20. The snowmobile of claim 19, further comprising an operator handle, said operator handle operating an actuator which actuates said first and second doors to open and close said first and second openings.

* * * * *

UNITED STATES PATENT AND TRADEMARK OFFICE
CERTIFICATE OF CORRECTION

PATENT NO. : 6,216,809 B1
DATED : April 17, 2001
INVENTOR(S) : Toyochika Etou, Masanobu Yamamoto and Shinobu Amano It is certified that error appears in the above-identified patent and that said Letters Patent is hereby corrected as shown below:

<u>Title page,</u>
Item [75], second inventor's name -- Masanobu Yamamoto --

Signed and Sealed this

Third Day of September, 2002

*Attest:*

JAMES E. ROGAN
*Attesting Officer*   *Director of the United States Patent and Trademark Office*